Jan. 6, 1959

H. E. BALSIGER ET AL 2,867,058

WORK TRANSFER APPARATUS

Filed Sept. 21, 1956

INVENTORS
H. E. Balsiger and
Alvin J. Jones.
BY Mason, Porter, Miller & Stewart
ATTORNEYS Jan. 6, 1959  H. E. BALSIGER ET AL  2,867,058
WORK TRANSFER APPARATUS
Filed Sept. 21, 1956  10 Sheets-Sheet 2

INVENTORS
H. E. Balsiger and
Alvin J. Jones
BY Mason, Porter, Miller & Stewart
ATTORNEYS

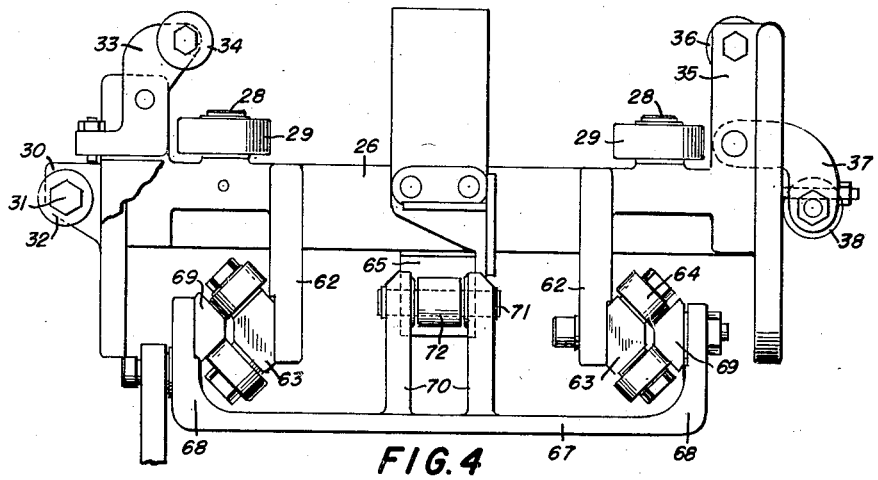
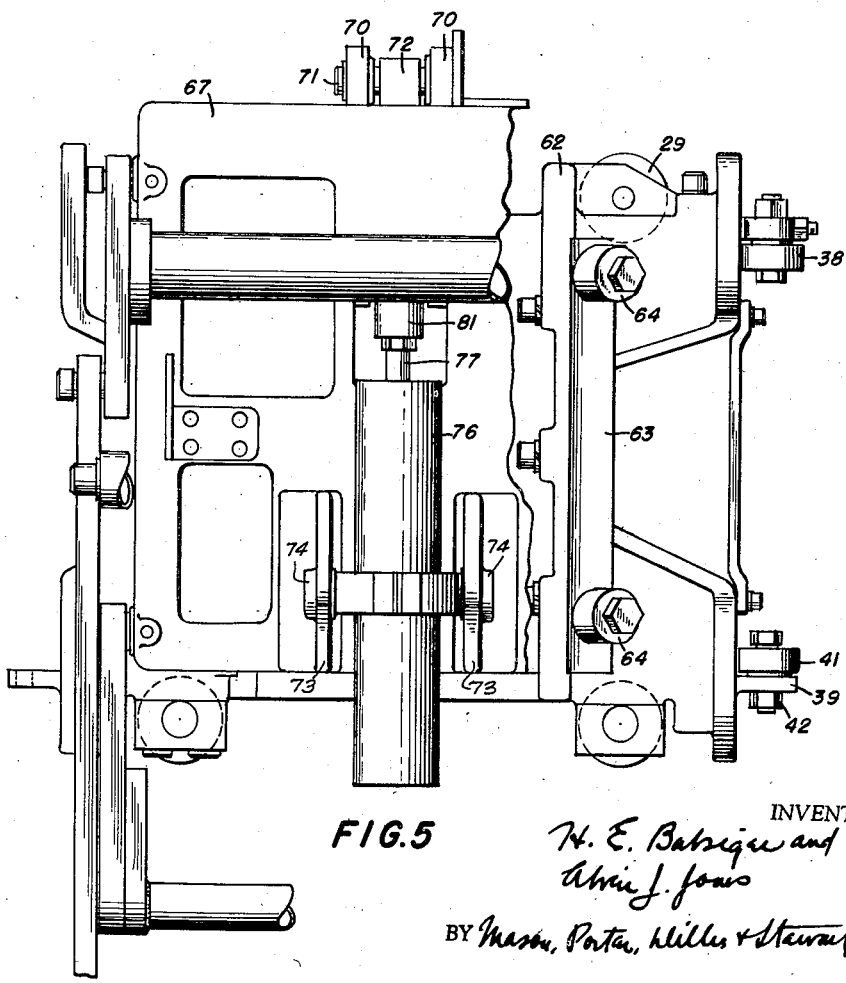

Jan. 6, 1959    H. E. BALSIGER ET AL    2,867,058
WORK TRANSFER APPARATUS
Filed Sept. 21, 1956    10 Sheets-Sheet 6
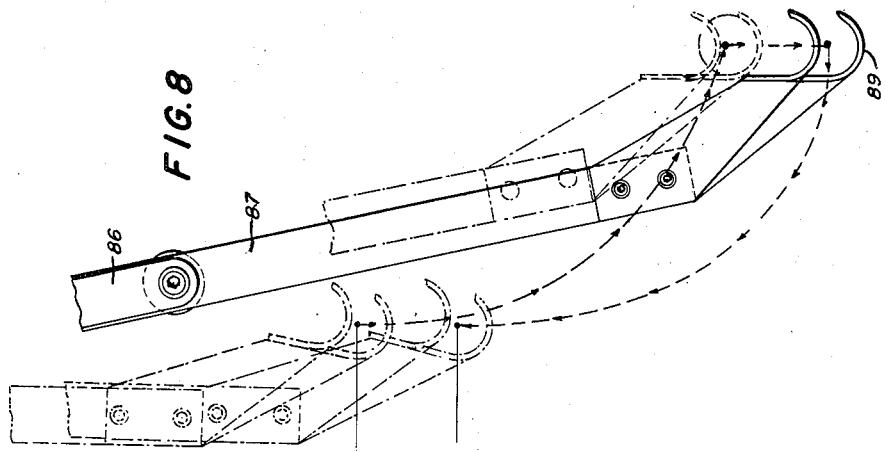
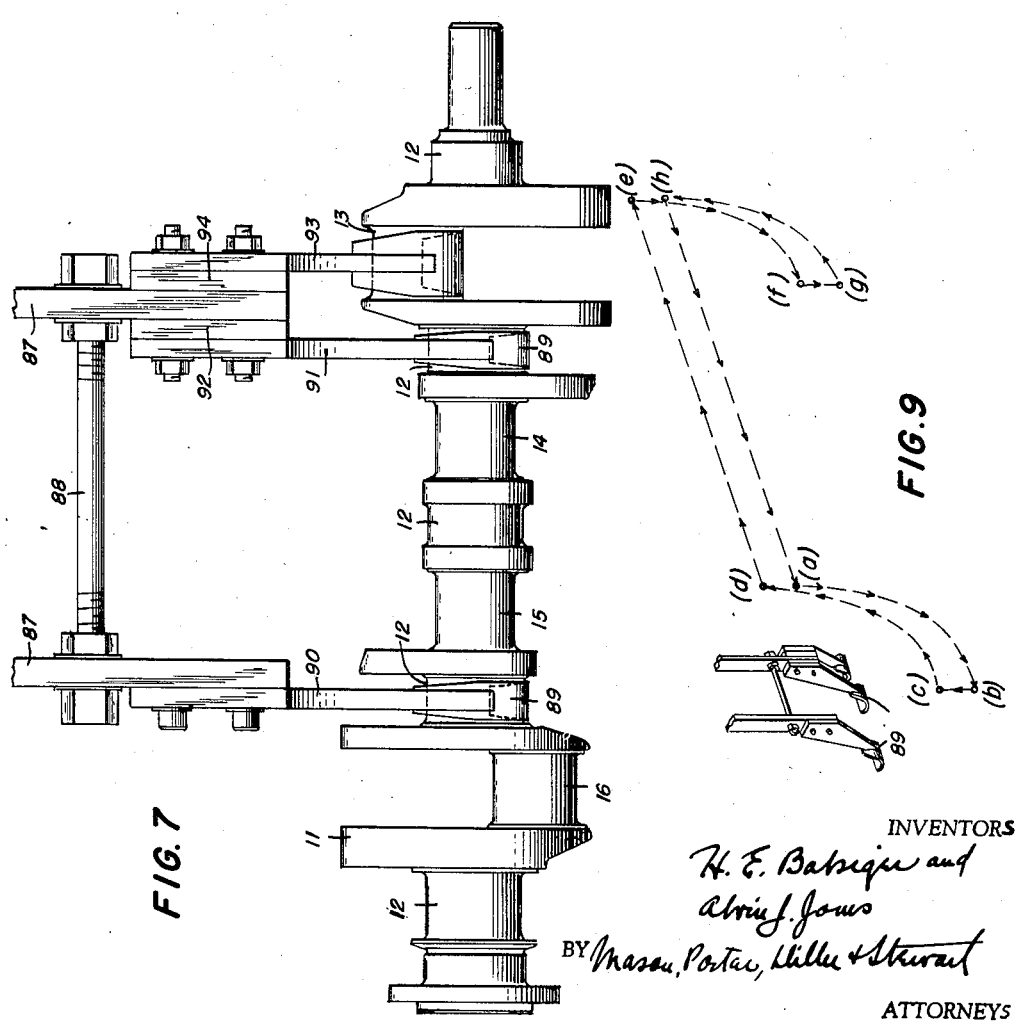
INVENTORS
H. E. Balsiger and
Alvin J. Jones
BY Mason, Porter, Diller & Stewart
ATTORNEYS

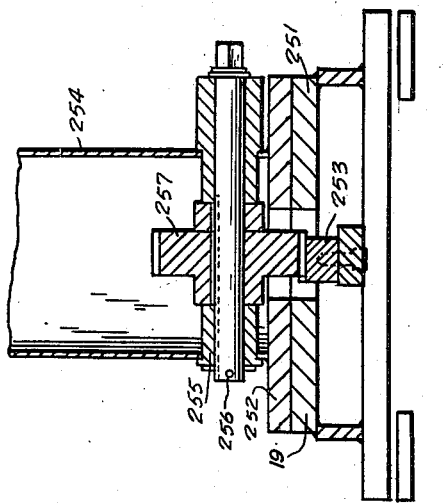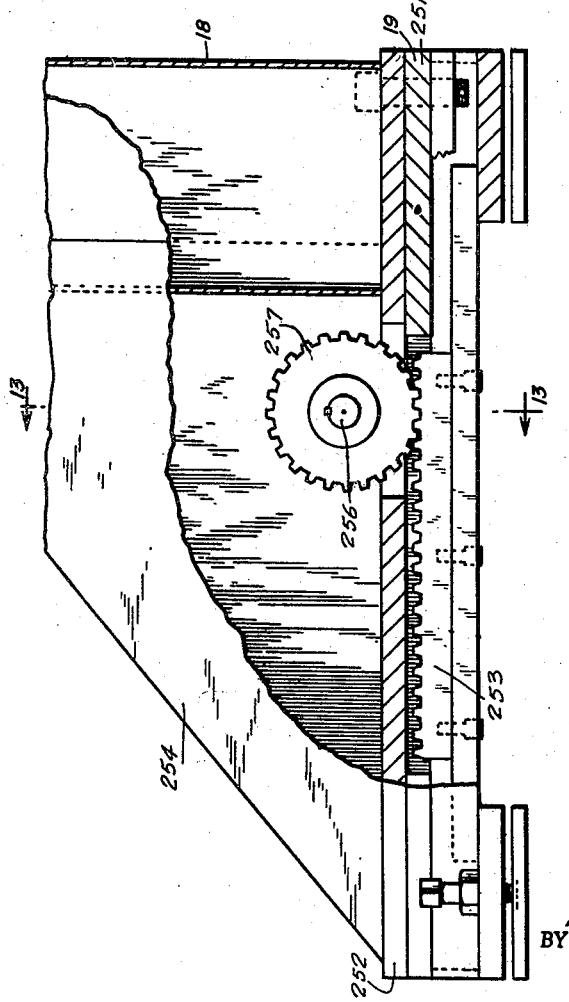

United States Patent Office 2,867,058
Patented Jan. 6, 1959

2,867,058

WORK TRANSFER APPARATUS

Harold E. Balsiger and Alvin J. Jones, Waynesboro, Pa., assignors to Landis Tool Company, Waynesboro, Pa.

Application September 21, 1956, Serial No. 611,393

20 Claims. (Cl. 51—105)

The following specification relates to work transferring apparatus primarily designed for handling articles such as crank shafts during the operations involved in precision grinding of the crank pins.

Machines are well known for grinding the bearings for crank shafts to accurate size. This operation can be done quite rapidly. There is, however, considerable time consumed and labor expended in mounting the work pieces for the grinding operation and subsequently removing them after the operation is complete. In loading the work pieces attention must be given to orienting them so that when mounted in the grinding machine, the crank pin which is to be ground is properly positioned on the axis of the machine and opposite the rotary grinding wheel.

The present invention is intended to provide apparatus for simultaneously loading and unloading work pieces such as crank shafts in the usual machines for grinding the pins of such shafts.

One of the objects of the invention is to mechanically present the unfinished or rough work in the desired selected position to bring the appropriate crank pin into axial position in the machine opposite the grinding wheel.

A further object of the invention is to provide means for picking up the work pieces one at a time and transporting them mechanically and without manual attention both into the grinding machine and also simultaneously removing the finished work from the machine.

An additional object of the invention is to provide a cushioning effect as each movement nears completion so that the machine may be operated at efficient speed and the several motive parts quickly decelerate at the end of their individual operations.

A still further object of the invention is to move the rough work pieces and the finished work pieces simultaneously in identical paths during their respective loading and unloading movements.

Among the objects of this invention is to provide separate and independently operating facilities for engagement with the work piece and its disengagement, and for moving it vertically.

It is moreover an object of the invention to provide such work-handling mechanism independently mounted for use with standard grinding machines and without requiring structural changes in the latter.

Other objects of the invention will be readily understood from the following description of the preferred form of the apparatus. By way of example the preferred form of the invention is illustrated in the accompanying drawings in which:

Fig. 4 is a plan view of the slide;

Fig. 5 is a front elevation of the same;

Fig. 7 is a front elevation of the work-carrying arms;

Fig. 8 is a side elevation of the arms below the parts shown in Fig. 5;

Fig. 9 is a diagrammatic representation of the path of the arms;

Fig. 10 is a longitudinal vertical section of the adjustable pedestal base;

Fig. 11 is a transverse vertical section of the base taken on line 11—11 of Fig. 10;

Figure 1:
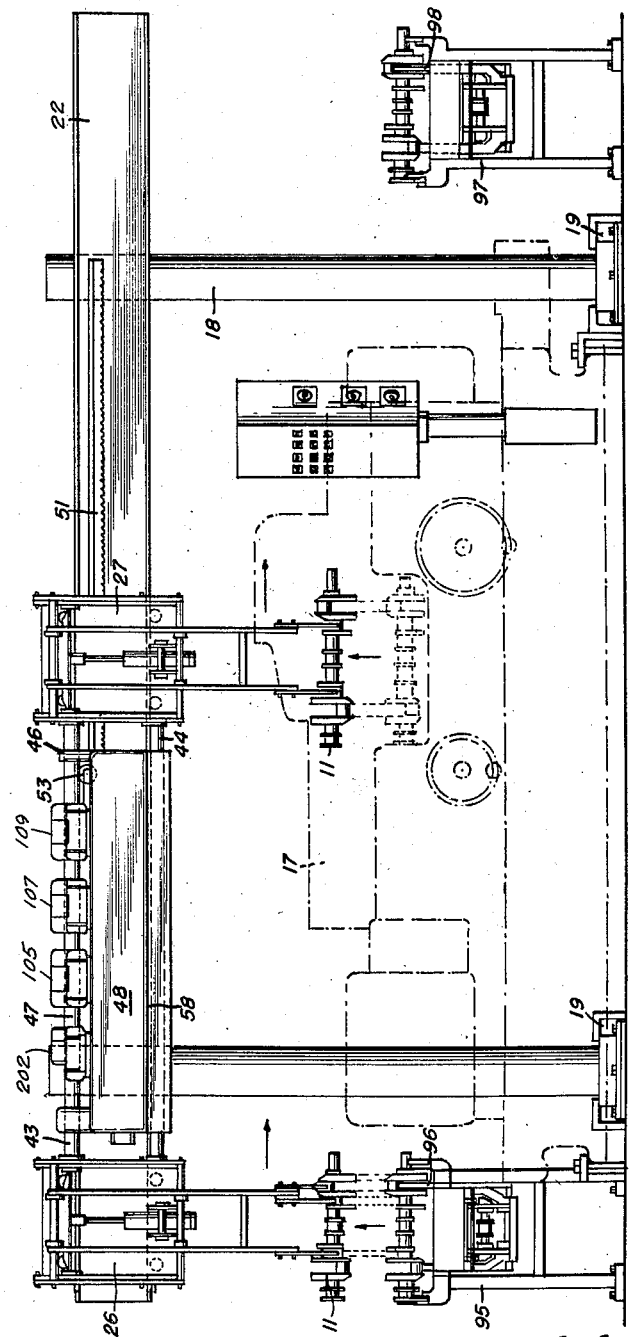
Fig. 1 is a side elevation of work transfer apparatus and related feeding and delivery mechanisms.
Figure 2:
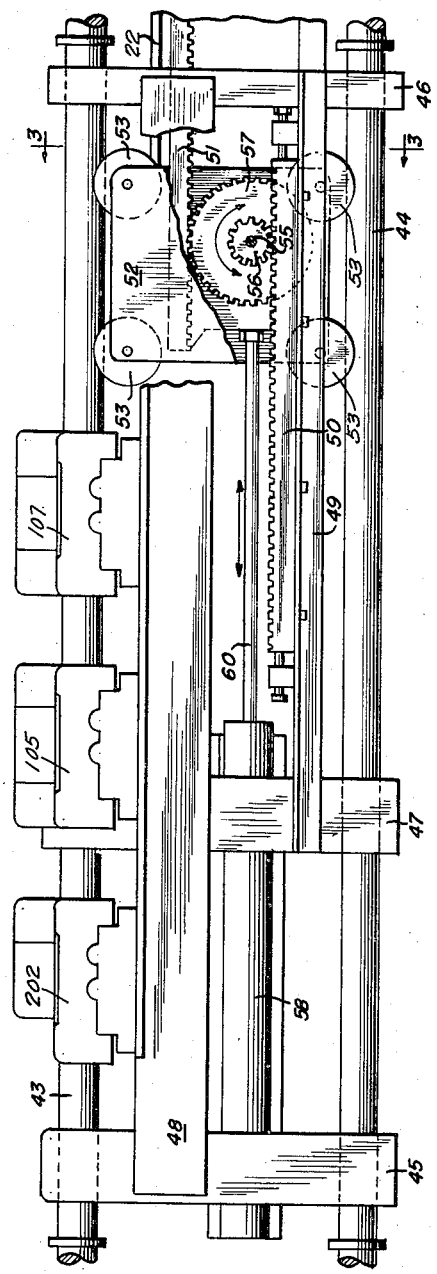
Fig. 2 is an enlarged side elevation of the traversing conveyer.

Briefly described the novel apparatus consists of an independently mounted support providing a traversing conveyer on which the work-handling mechanisms are mounted for concerted movement. These work-handling mechanisms are identical structurally and move together through the same path. One is arranged to pick up a piece of rough work, transport and deposit it in the chuck of the grinding machine, while the other mechanism is simultaneously removing the finished work and delivering it to a work receiving station. Each work-handling mechanism includes a device for giving the work-engaging member a curvilinear path as required for engaging or disengaging the work piece. A separate and independent operating mechanism is utilized to lift and lower the work engaging member both while it is engaged in carrying the work piece and also in both engaging and disengaging movements.

As shown in the drawings, the work piece consists by way of example of the crank shaft 11. This crank shaft is provided with the usual line bearings 12, 12 and the intermediate crank pins 13, 14, 15 and 16. It is assumed that the end crank pin 16 is the one which is to be presented opposite a rotary grinding wheel and ground to precise size.

Figure 3:
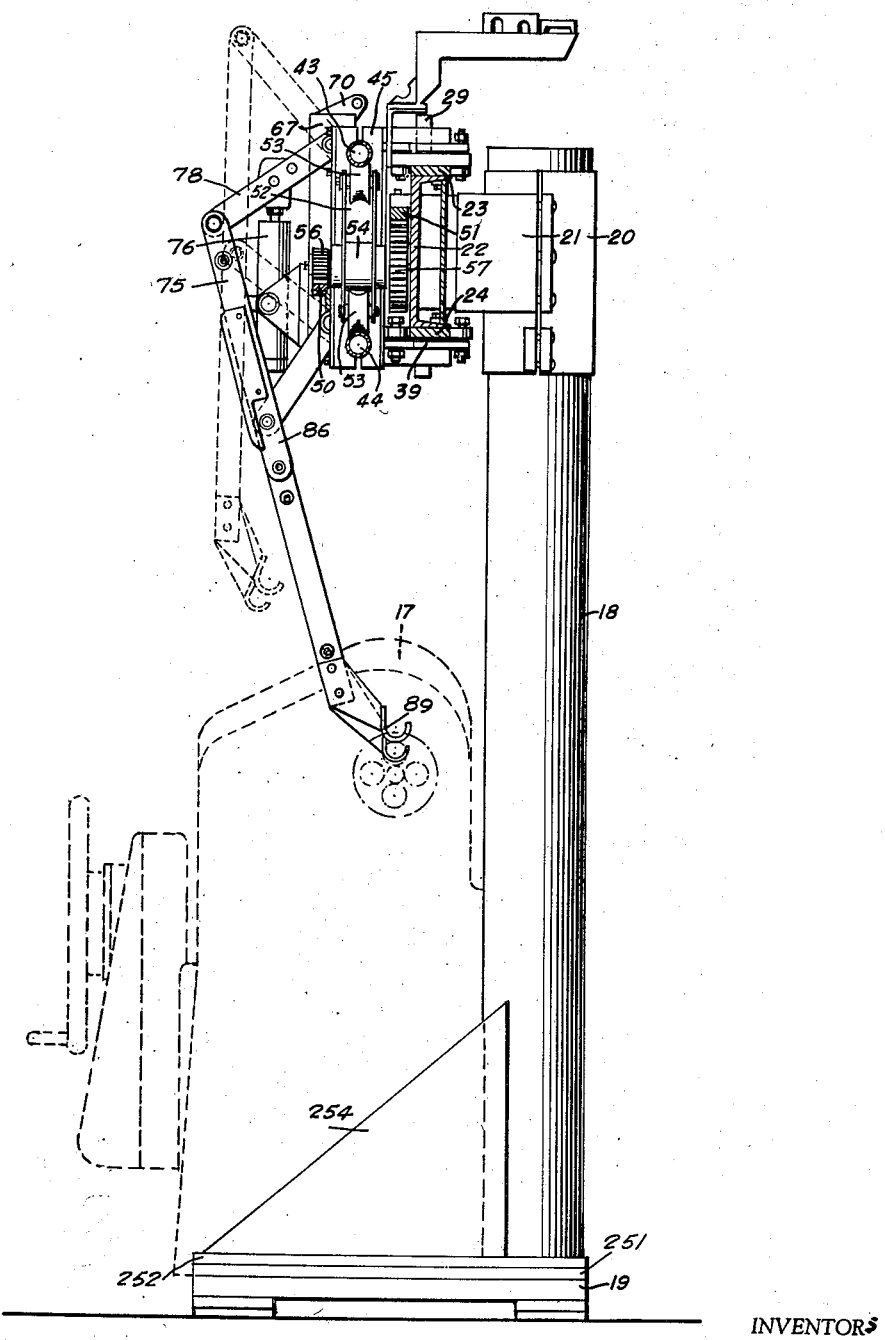
Fig. 3 is a side elevation partly in section, of the hoist used.

To diagrammatically illustrate the required movements of the material, the machine for grinding crank bearings of this crank shaft is shown in dotted lines at 17 on Figs. 1 and 3.

Back of the vertical plane of the work receiving chuck, there is provided a pair of pedestals 18, 18. These pedestals rest on adjustable bases on the floor in such fashion that the pedestals may be adjusted from front to rear and then clamped into position so that the work piece is presented in the axis of the grinding machine as indicated on Fig. 3.

This adjustment is carried out by providing fixed bases 19, having a top 251 with a smooth surface. A slide plate 252 rests on the top 251. The slide plate 252 supports the pedestal 18.

Both the top 251 and the plate 252 are longitudinally slotted as shown on Fig. 11. A fixed rack 253 is attached to the base 19 and projects upwardly through the slot in the top 251.

The plate 252 also has a housing 254 which carries a transverse journal bearing 255 for a rotary shaft 256. The shaft has a keyed pinion 257 which projects through the slots in the top 251 and plate 252 for engagement with the rack 253. One end of the shaft 256 is extended beyond the housing and squared for use in rotating the pinion.

By adjusting one or both plates 252 relative to the base top 251, the pedestals can be shifted to bring the work holders in line with the axis of the chuck of the machine.

The pedestals 18, 18 (Fig. 3) have collars 20 which are clamped rigidly and carry brackets 21. These brackets 21 extend forwardly and support a longitudinally extending beam 22.

The beam 22 is provided with a backwardly extending flange forming an upper track 23. A lower flange also extending backwardly from the beam 22 forms a lower track 24. These tracks are provided for the proper support and guidance of the traversing carriage 25.

The traversing carriage denoted generally as 25 has a pair of opposite trucks 26 and 27. Each truck carries a pair of horizontal stub-shafts 28, 28 (Fig. 4) which overhang the upper track 23. A pair of loose rollers 29, 29 on stub shafts 28, 28 support the frame 26 and ride upon the top of the upper track 23.

The truck 26 has a forward flange 30. This carries a vertical stub shaft 31 which supports a loose roller 32. This roller rides along the front edge of the track 23. An extension 33 is fitted on the frame 26 and extends to the rear as shown in Fig. 4. This extension also carries a loosely journalled roller which is in contact with the rear edge of the upper track 23.

At the opposite end of the frame 26 there is a corresponding rearward extension 35 having a loose roller 36.

A link 37 mounted on the extension 35 is provided with a loosely journalled roller 38 engaging the front edge of the upper track 23.

The loose rollers 32, 34, 36 and 38 maintain the frame in proper position with respect to the upper track 23 on which the frame is supported by the two rollers 29, 29.

The lower portion of the truck 26 (Figs. 3 and 6) carries a rearwardly directed bracket 39 upon which there is an upstanding, loosely journalled roller 40.

Figure 6:
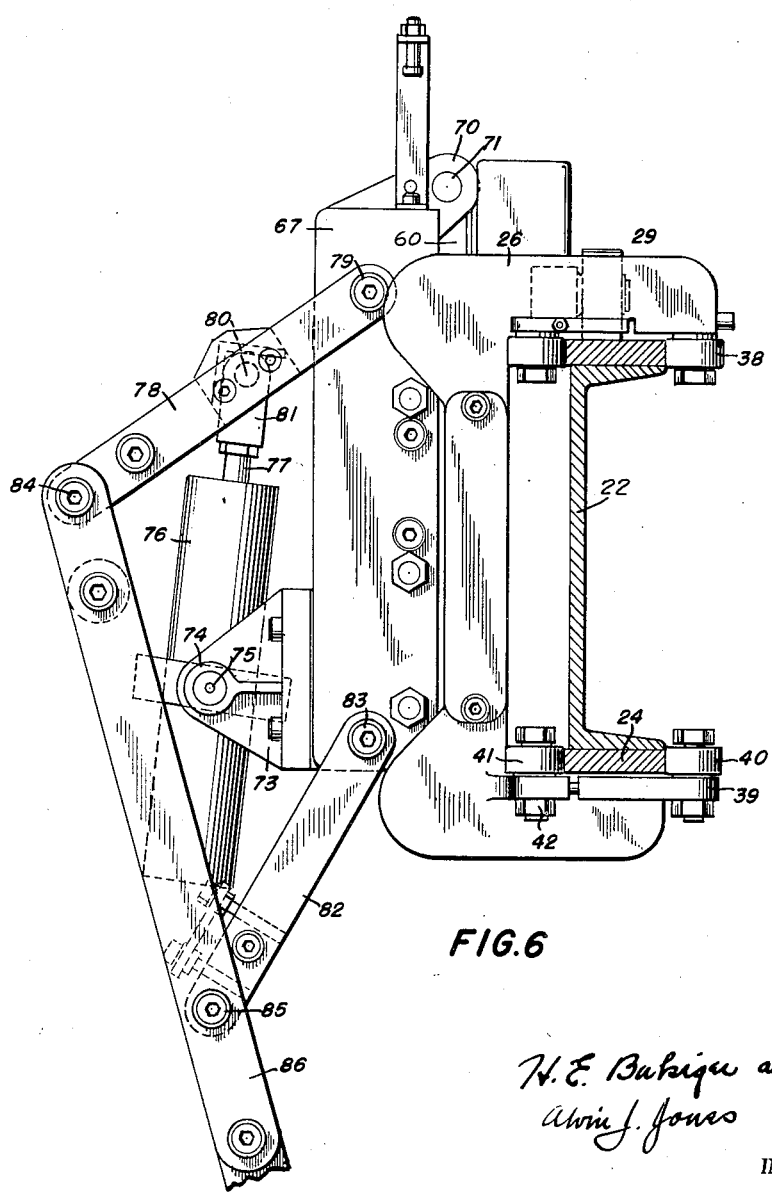
Fig. 6 is a side elevation partly in section of the slide and arms in the lowered position.

A second loosely journalled roller 41 is mounted on a bracket 42 on the truck 26 in the same plane as the roller 40. As shown in Fig. 6, rollers 40 and 41 ride upon the lower track 24 and maintain the truck 26 in proper vertical position.

Truck 27 is provided with the same arrangement of rollers 29, 32, 34, 36, 38, 40 and 42, as has been described for carriage and truck 26.

Trucks 26 and 27 are maintained in spaced position by means of rigid upper and lower spacing bars 43, 44, respectively. These bars are horizontal and have their ends firmly bolted in the adjacent or inner sides of the trucks 26, 27.

A pair of front and rear vertical clamps 45 are fastened at the left to the spacing bars 43 and 44 (Fig. 3). A similar pair of clamps 46 are fastened to the right ends of the spacing bars 43 and 44. The bars 43 and 44 also carry an intermediate pair of vertical clamping bars 47. The clamping bars 45, 46 and 47 provide supports for an upper plate 48 extending between bars 45 and 46 and a lower plate 49 which extends between clamps 47 and 46. The lower plate 49 carries a toothed rack 50 facing upwardly. A downwardly facing toothed rack 51 is mounted on the face of the beam 22 in spaced arrangement above the rack 50.

A traveler 52 is mounted to roll between the spacing bars 43 and 44 by means of concave rollers 53.

The traveler 52 has a transverse bearing 54 as shown in Fig. 3. The bearing holds a horizontal shaft 55. The shaft 55 is extended in front to carry a pinion 56 which engages the toothed lower rack 50.

The rear end of the shaft 55 carries a gear wheel 57. This gear wheel engages the toothed rack 51 on the front of the beam as shown in Fig. 3.

A hydraulic pressure cylinder 58 is mounted on the rear of the front clamping bars 45 and 47. This cylinder carries a piston (not shown) with the piston rod 60 extending beyond the right of the cylinder.

The eye 61 of the piston rod is coupled to the traveler 52.

Pressure applied to the left of the piston will force the traveler to the right. At the same time the gear 57 also travels to the right of the rack 51. The rotation of the shaft 55 as a consequence is applied in a counterclockwise direction to the lower rack 50. This causes an accelerated movement of the traversing carriage 25.

In this way the limited movement of the piston rod 60 is multiplied to shift the carriage 25 the full distance between the loading rack and the chuck of the grinding machine in one instance and simultaneously between the latter and the delivery rack in the other instance.

Truck 26 (Fig. 4) has two forwardly projecting vertical fins 62, 62 (Fig. 4). Each fin carries a vertical rail 63 having two right-angularly disposed faces. Pairs of idle rollers 64, 64 are mounted on these faces.

The truck 26 also has attached a vertical hydraulic pressure cylinder 65. A piston rod 66 from cylinder 65 extends in an upward direction as shown in Fig. 5.

A slide 67 is provided with two backwardly directed flanges 68, 68. These flanges extend outwardly opposite the rollers 64. Each flange 68 has a slide bar 69 mounted on its inner face and between the pairs of idle rollers 64, 64 on the adjacent rail 63.

As shown in Fig. 4 the rear face of the slide 67 carries a centrally positioned pair of lugs 70. A pin 71 connecting the outer ends of the lugs 70 forms the journal for the eye 72 on the piston rod 66.

By this means the vertical reciprocation of the piston rod 66 serves to raise and lower the slide 67 relative to the supporting truck 26.

The front face of the slide 67 carries a pair of brackets 73. These brackets form bearings 74 for the trunnions 75 of a rocking hydraulic cylinder 76. The piston rod 77 of the cylinder extends above the piston as indicated on Fig. 6.

The means for shifting the workpiece consists of a system of linkage mounted on the slide 67. This linkage is a modified pantograph of which all four sides are of different lengths. The linkage is provided by pairs of links pivoted one to another and to the opposite sides of the slide 67. The links 78 of the upper pair are pivotally mounted at 79 on opposite sides of the slide 67 as shown in Fig. 6. A cross bar 80 between the links 78 at an intermediate point forms a bearing for the head 81 on the piston rod 77.

A lower pair of links 82 is also pivoted to the opposite sides of the slide 67 at pivots 83.

It will be noted from Fig. 6 that the upper links 78 are longer than the lower links 82 so that the arcs of movement of the pairs of links are different.

The outer ends of the upper pair of links 78 are connected by a cross bar 84. The outer ends of the lower links 82 are connected by a cross bar 85. Parallel arms 86 are pivoted on the cross bars 84 and 85 outside the links 78 and 82. The portion of the arms 86 between the cross arms 84 and 85 is materially longer than the distance between the pivots 79 and 83 on the side of the slide 67. The result is that the lower portions of the arms 86 are given a swinging movement similar to the movement of a manually held shovel whenever the piston rod 77 is raised by the pressure in the cylinder 76.

The lower ends of the arms 86 (Fig. 4) are formed with extensions 87 which are connected by means of the cross arm 88. Extensions 87 below the cross bar 88 carry a series of backwardly directed hooks 89. These hooks are mounted on bars which are bolted to the ends of the bars 87. As shown in Fig. 7, bar 90 is bolted directly to the end of the left-hand extension 87. However, the bar 91 while bolted to the corresponding right-hand extension 87 is separated from the latter by a spacing plate 92. In the particular case illustrated in Fig. 7, both bars 90 and 91 are placed at the left of the extensions 87 so that the attached hooks 89, 89 will carry the crank shaft to be ground by engagement with two of the intermediate line bearings 12, 12. This spacing is provided by a suitable thickness of the spacer 92.

A third bar 93 is provided shorter than the bars 90 and 91. The bar 93 is bolted to the outside of the right-hand extension 87 and spaced therefrom by means of spacer 94. The length of the bar 93 is such that it will hold a crank pin 13 in its upper position as shown in Fig. 7. In this arrangement the opposite crank pin 16 is in the lowermost position. It will thus be at the right level for axial alinement with the chuck of the grinding machine when brought opposite the grinding wheel.

The bars 90, 91 and 93 are interchangeable. Thus, the bars 91 and 93 may be reversed in position and clamped to the left-hand extension 87 in place of the bar 90 which then can be bolted to the right-hand extension 87. In this position the shorter bar 93 will be outside of the left-hand extension 87 and the longer bar 90 will be outside of the right-hand extension 87. When arranged in this manner the hooks 89 of the longer bars 90 and 91 will still hold line bearings of the crank shaft. The hook of the shorter bar 93 will however hold the crank pin 16 in elevated position and leave the crank pin 13 in lower position, where it may be held axially by the chuck and opposite the grinding wheel.

By shifting the shorter bar 93 opposite the crank pin 15, the latter may be held in elevated position while the relatively displaced pin 14 will be lowered into axial position with respect to the chuck of the grinding machine.

A similar transposition will bring crank pin 14 into position to be ground.

It is also to be understood that the bars 90, 91 and 93 may be adjusted vertically on the lower extensions 87 to insure the proper axial position of the work piece relative to the chuck.

The right-hand truck 27 is equipped with the same slide 67 and pantographic arrangement of linkage as above described. However, in this instance the shorter bar 93 is omitted. The bars 90 and 91 are adjusted to fit any selected pair of line bearings. It is not necessary to orient the work piece for its removal from the grinding machine and its delivery to a discharge rack.

The feeding and discharge conveyers which are used with the transfer mechanism, are of a well known type. The feeding conveyer 95 consists of reciprocating tracks which move the work-piece step by step to the end where it will be below the transfer mechanism. In this operation a rail 96 raises the right-hand crank of the crank shaft 11 as shown in Fig. 1. This turns the crank shaft 11 into a position as shown in Fig. 7. This provides for proper presentation of the several bearings and the crank pin 13 for engagement by the bars 90, 91 and 93.

Suitable motive power is provided for the feeding conveyer 95, so that the work pieces are advanced to the delivery point timed in advance of the approach of the transfer mechanism for a pick-up.

A discharge conveyer 97 is set up in position to receive the finished work-piece after the traversing conveyer has brought it from the grinding position. When the work-piece is set upon the conveyer, the work-piece will be advanced step by step. At the same time it will be turned partially by the rail 98. This rail will be positioned so that one of the crank pins will be held in an upper position, while another is centered for grinding on a second grinding unit.

The transfer mechanism above described serves the operation of grinding one of the crank pins of the crank shaft. A separate grinding machine is used for each crank on the shaft. The grinding machines are arranged in generally straight line, but individually offset. In this way work completed by the first unit will be conveyed by the discharge conveyer 97 into position to be picked up and deposited in the chuck of the second grinding unit. The same operation will advance the finished work on the second unit to a succeeding unit. This operation will be repeated until all cranks have been ground.

The movement of the transfer apparatus is produced by the operation of the several hydraulic pressure cylinders. Thus cylinder 58 will cause the traverse of the mechanism as a whole. The lifting and lowering of the slides 67, 67 is the result of the operation of the cylinders 65.

The swinging movement of the hooks follows the actuation of the rocking piston rod 77. It is to be understood that each pressure cylinder is operated independently. Also the traverse occurs when the other cylinders are not in motion. Due to the lifting of the slide 67 and swinging of the arms 86 the movement of the hooks 89 follows a compound curve as indicated on Figs. 8 and 9.

If we assume the carriage to be at its extreme left-hand position with the slide 67 above the receiving feeding conveyer 95 with the work piece 11 resting in proper position, then the hooks may be in a position represented at $a$ of Figs. 8 and 9. The slide 67 is already lowered. The arms 86 are swung inwardly until the hooks reach a position $b$ beneath the work-piece. At that point slide 67 rises so that the hooks engage beneath the bearings and the positioning crank of the work-piece, lifting the latter a short distance vertically to lift it free, and into the position shown at $c$. The slide 67 is then raised and the arms 86 swung out. This results in a compound curve movement with the work-piece lifted as far as is necessary to clear the grinding machine. This brings the work-piece to the position indicated at $d$ on Fig. 9.

The mechanism is then traversed to bring the work-piece above the open throat of the chuck of the grinding machine. This is represented at $e$ on Fig. 9.

At this point the slide 67 is lowered and the arms 86 are swung inward to bring the work piece into the grinding machine chuck $f$.

The slide is then lowered farther to deposit the work on the supporting member of the chuck and then to disengage the hooks 89$g$ from the work piece.

The next movement of the arms 86 is an outward swing and rise to an intermediate level $h$. Slide 67 does not move upward at this time. This level is the same as that from which the transfer mechanism started.

The carriage is then traversed to the left to bring the hooks to the original starting point $a$.

While this series of movements takes place for the slide 67 and the associated parts, the same movements are carried out for the right-hand slide 67.

While the left-hand slide 67 is lowered for engagement of the hooks with the rough work-piece, the hooks of the right-hand slide 67 are brought below the finished work. Both sets of hooks engage the respective work-pieces so that the finished work is removed from the grinding machine, while the unfinished work-piece is being lifted from the receiving conveyer.

Both the finished and unfinished work-pieces are then traversed so that the finished work is brought above the discharge conveyer when the unfinished work is delivered to the grinding machine.

The finished work is deposited upon the discharge conveyer in the same movement by which the unfinished work is set up in the grinding machine.

Both slides 67, 67 disengage from the work at the same time, the hooks are swung out and shifted empty to the left end limit of movement (Fig. 1). Here they are in position to repeat the cycle of operation.

The operation of the several hydraulic cylinders which constitute the motor power for the traversing operation, the lifting movement and the swinging movement is supplied by a common source of pressure such as oil or air. This is supplied from a pump 100 which is motor driven and provided with a pressure relief valve in the usual manner. The fluid is obtained by the pump from the sump 101 of the return or low pressure pipe 102. The pump delivers through the high pressure pipe 103 to the several reciprocating motors.

The high pressure pipe 103 has branches which lead to the several operating valves. Thus branch 104 leads to the traversing valve 105; branch 106 leads to the swing valve 107 and branch 108 leads to the lift valve 109.

The traversing valve 105 has a valve spool 110. This spool is held in mid-position in the valve chamber 111 by means of opposing springs 112, 112. In its middle point the spool 110 has a collar 113 which blocks the entrance of pressure fluid through the pipe 104.

A spaced collar 114 is at the right of collar 113 while a collar 115 is spaced at the left of collar 113. In the middle point the space between collar 113 and collar 114 is connected to a discharge pipe 116 leading through flow control valve 117 to the left end inlet 118 of the traversing cylinder 58.

In like manner the space between the collars 113 and 115 leads through outlet pipe 119 and the flow control valve 120 to the opposite inlet pipe 121 of the traversing cylinder 58.

There is a by-pass passageway 122 provided from the inlet 104 to a small piston chamber 123 mounted above the main operating valve. This chamber 123 has a pilot valve member 124 with three spaced collars 125, 126 and 127. In normal position, the middle collar 126 blocks the by-pass 122. The pilot valve 124 is held in mid-position by opposed springs 128 and 129. The opposite end 130 and 131 of the valve member 124 are armatures movable within solenoids 132 and 133.

There is a discharge passageway 134 which leads through one end of the chamber 123 and to the pipe 135 leading to the low pressure return line 136, thence to the sump and the pump.

The actuating piston chamber 123 is connected by passageway 137 to the left end of the traversing valve 105. A similar passageway 138 connects with the right end of the cylinder 105.

Figure 12:
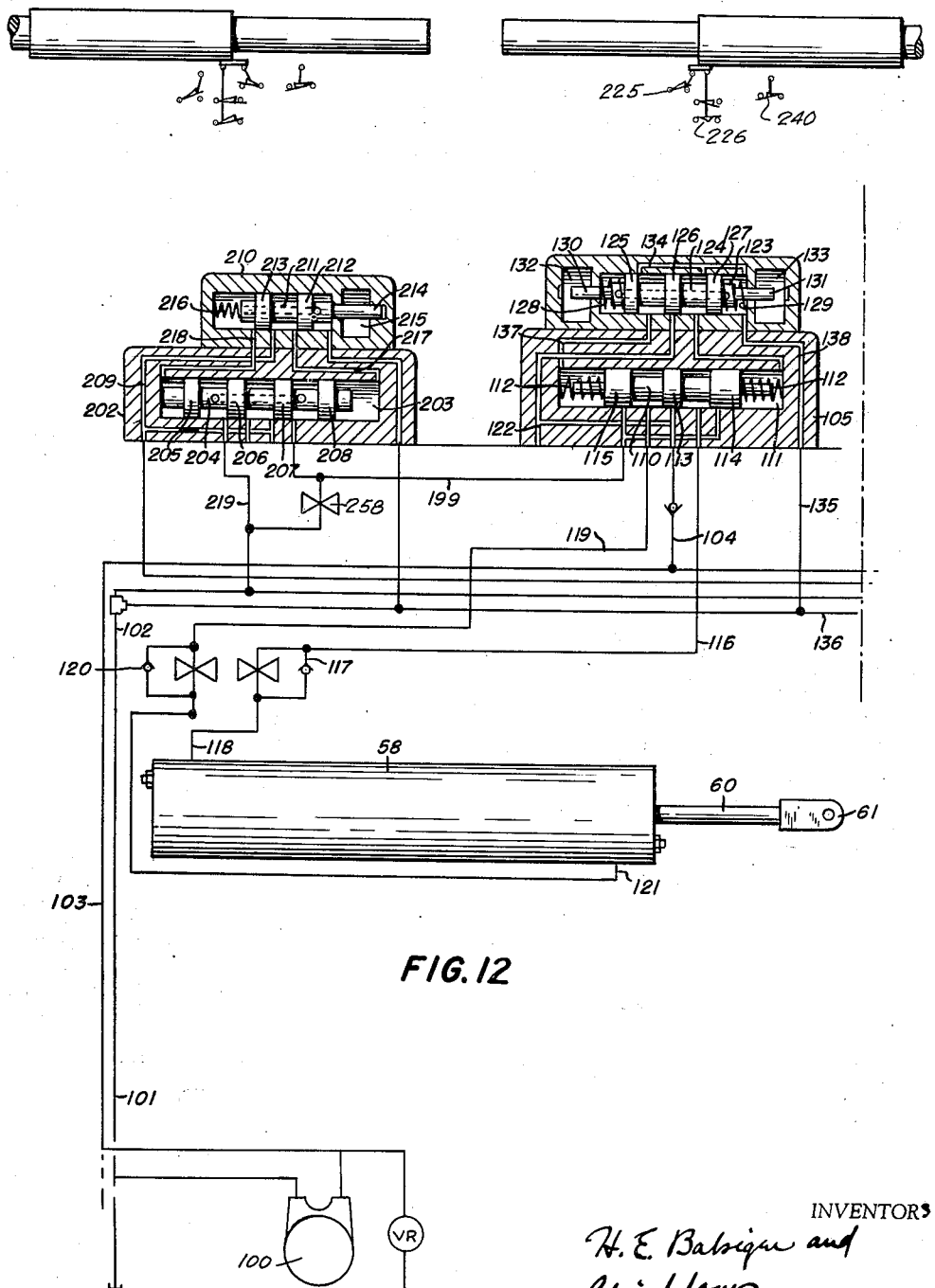
Fig. 12 is a schematic diagram of the hydraulic operation for traversing and cushioning.

In the normal position as shown on Fig. 12, the actuating pilot valve member 124 blocks entry of the high pressure fluid through the by-pass 122. If the solenoid 132 is energized, the armature 130 moves to the right shifting the collar 126 to the right. At the same time the pressure fluid is delivered through passageway 138 to the right end of the traversing valve 105.

This causes the traversing valve to shift to the left and to admit pressure fluid through the pipe 104 into the space at the right of collar 113. Pressure fluid passes through pipe 116 to the left end of the traversing cylinder 58. As a result piston and the carriage are withdrawn to the left and into the position for picking up the work from the feeding conveyor 95.

If, however, the solenoid 133 is energized the pilot valve member 124 is shifted to the right. The passageway 138 from the right of the operating valve discharges low pressure fluid through pipe 134. At the same time collar 125 blocks pipe 135 while pressure fluid rises through by-pass 122. The fluid is then led through pipe 137 to the left end of the operating traverse valve 105. This causes the valve spool 110 to shift to the right. At the same time pressure fluid from the pipe 104 is delivered through the valve to the pipe 119 and thence to the right-hand side of the traversing cylinder 58. Branch low pressure outlet pipe 199 leads from opposite sides of the operating valve cylinder 111 to a cushion valve 204 which will be described later.

Delivery of the pressure fluid through pipe 119 causes the traversing piston to travel to the right.

Figure 13:
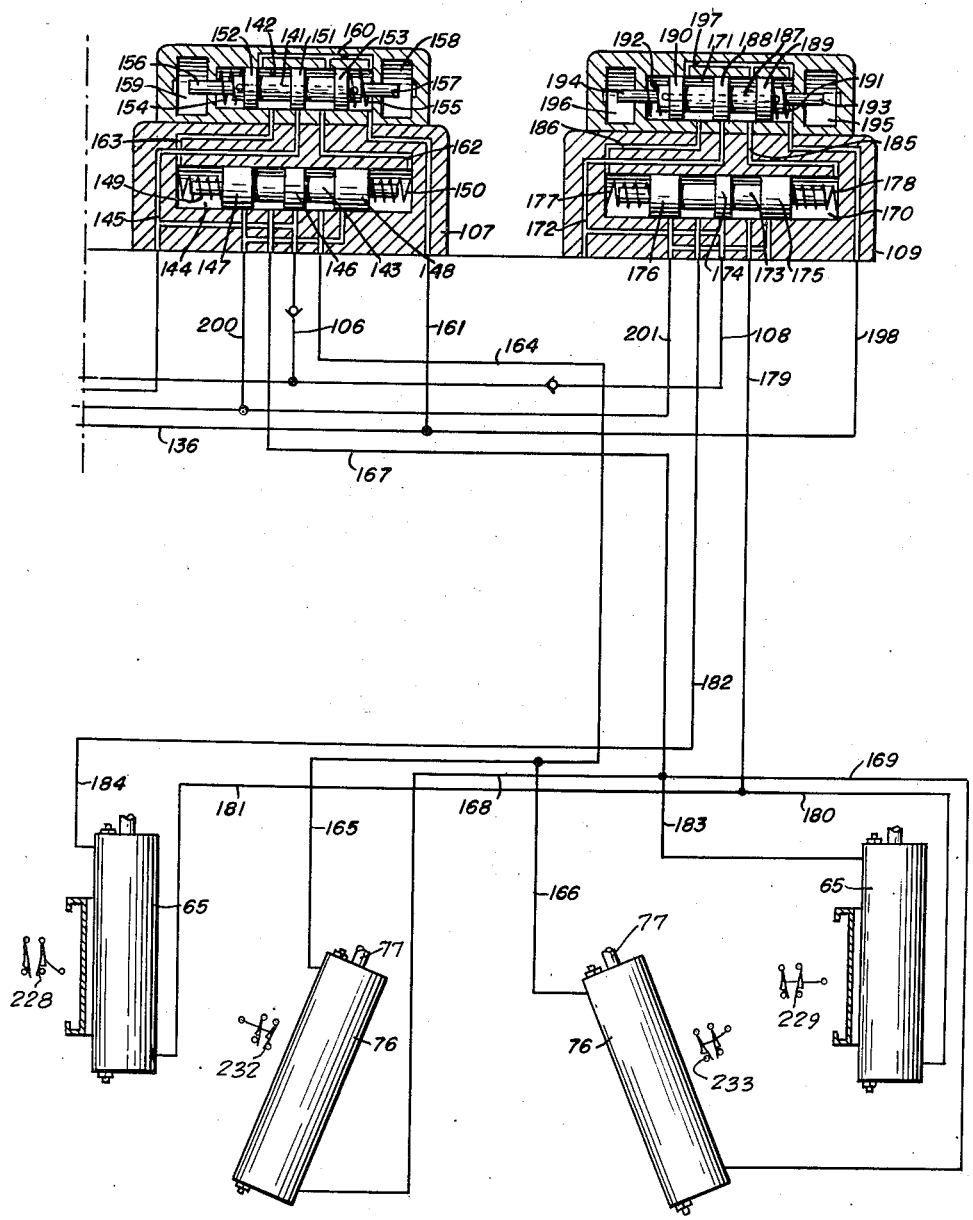
Fig. 13 is a schematic diagram of the hydraulic operation of providing vertical and swinging movement.
Figure 14:
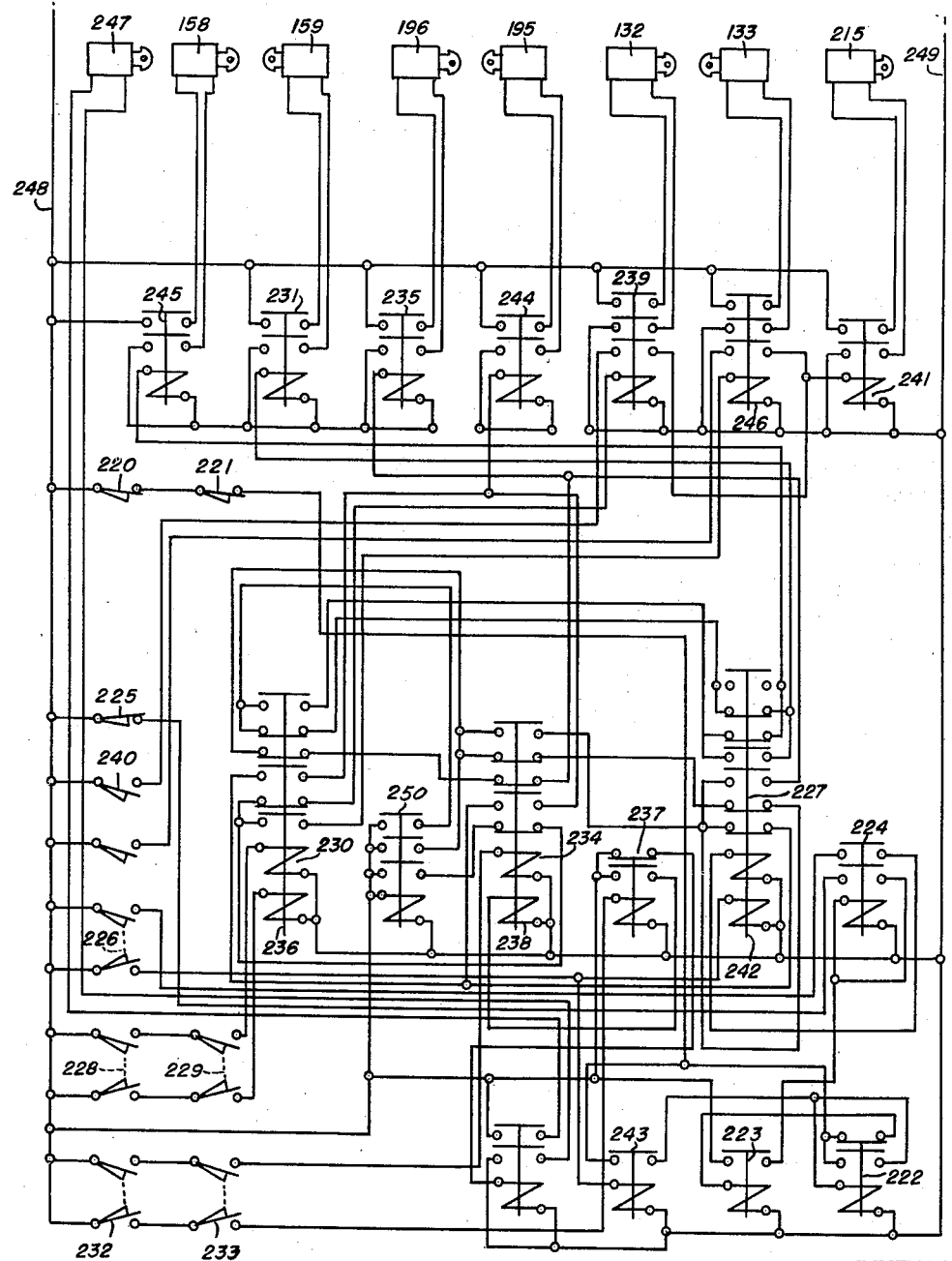
Fig. 14 is a wiring diagram of the electric circuits.

A similar valve 107 (Fig. 13) serves to supply the fluid under pressure simultaneously to two identical swing cylinders 76, 76.

The pressure fluid is supplied through the branch pipe 106 to the valve 107. The valve includes an actuating or pilot piston 141 in a pilot cylinder 142 and a reversing valve 143 in a cylinder 144. A by-pass 145 from line 106 permits pressure fluid to reach cylinder 142.

Reversing valve 143 has a central collar 146, a left collar 147 and a right collar 148 spaced from each other. The valve is held in mid-position by means of opposed springs 149 and 150. In the middle position the collar 146 blocks entry from the pipe 106.

By-pass 145 leads to the center of the chamber 142 opposite a central collar 151 on a valve 141. The valve 141 has also a left collar 152 and a right collar 153 spaced from the central collar 151. The valve is held in mid-position normally by means of coil springs 154 and 155. The ends of the valve 141 are formed as armatures 156 and 157 within right-hand solenoid 158 and left-hand solenoid 159.

A vent passageway 160 leads from the cylinder 142 around the end thereof to a low pressure return pipe 161. This pipe is connected with the return pipe 136.

A passageway 162 leaves the cylinder 142 at the right of by-pass 145 and leads to the right end of the reversing valve 143.

A similar pipe 163 leaves the cylinder 142 at the left of the inlet pipe 145 and leads to the left end of the reversing valve 143. A pipe 164 leads from the reversing valve 143 and is directed to two branch pipes 165 and 166 leading to the upper ends of swing cylinders 76, 76 on the slides 67, 67.

A similar pipe 167 leads from the inlet pipe 106 to branch pipes 168, 169 and to the opposite or lower ends of the swing cylinders 76 on slides 67, 67.

When the solenoid 158 is energized the actuating valve 141 is pushed to the right.

At the same time high pressure fluid through by-pass 145 passes in at the left of the collar 151 and discharges through 163 to the left end of reversing cylinder 144. Therefore the reversing valve 143 is shifted to the right and the pressure fluid from pipe 106 permitted to flow into pipes 167, 168 and 169 to the lower ends of the spring cylinders. The piston rods 77 are thus raised and the arms 86 caused to swing outwardly.

If solenoid 159 is energized, the pilot valve 141 is shifted to the left. However, it admits high pressure fluid from by-pass valve 145 to pipe 162 and the right-hand end of the reversing cylinder. The valve 143 is thus shifted to the left. The pressure fluid from pipe 106 passes to the right of the collar 146 and down through pipes 164 to branches 165 and 166, thence to the upper ends of the swing cylinders 76. The piston rods 77 are therefore depressed and the arms 86 swing inwardly.

The valve control for the lift cylinders of both carriages 67, 67 receives high pressure fluid through the pipe 108.

The slide lifting arrangement includes a reversing valve cylinder 170 and its pilot valve cylinder 171. The pipe 108 leads direct to the cylinder 170 and has a by-pass 172 leading to the middle point of actuating cylinder 171. The operating cylinder 170 has a valve 173 with a middle collar 174, a right-hand collar 175 and left-hand collar 176. Balancing springs 177 and 178 maintain the valve 173 normally with the collar 174 blocking the pipe 108.

An outlet pipe 179 leads to branches 180, 181 connected with the lower ends of the lift cylinders 65.

A right-hand passageway 185 leads from a point at the right of pipe 172 in the cylinder 171 to the right-hand end of operating cylinder 170.

A similar pipe 186 leads from the left of the passageway 172 in the actuating cylinder 171 to the left of the operating cylinder 170.

The cylinder 171 contains a valve member 187 which has a central collar 188, a right-hand collar 189 and a left-hand collar 190. The valve 187 is maintained normally in central position blocking the passage 172 by balancing springs 191 and 192. The ends 193, 194 of the valve member 187 form armatures within a solenoid 195 at the right and a solenoid 196 at the left.

A discharge passageway 197 leads from the side of the actuating valve cylinder 171 across the end thereof and to a vent pipe 198. This pipe 198 is connected in turn to the return pipe 136.

The operation of this valve means is similar to what has been already described. When solenoid 195 is energized, valve 187 is shifted to the left admitting pressure fluid through 172 and 186 into the left end of the cylinder 170. This results in shifting valve 173 to the right and delivering pressure fluid from pipe 108 to pipes 179 to the lower ends of the lift cylinders 65, 65. Conversely energizing solenoid 196 shifts the valve member 187 to the right. Pressure fluid through by-pass 172 is then led to the right-hand end of the valve 173. The latter is shifted to discharge pressure fluid from pipe 108 to pipe 179, branches 180 and 181 to the lower ends of the lift cylinders 65, 65. This causes the pistons to rise and carry the slides 67, 67 upwardly.

Each of the valves 105, 107 and 109 have discharge pipes 199, 200 and 201 respectively. Pipes 200 and 201 lead to return pipe 102. These serve to vent low pressure fluid from the sides of the valves opposite those in which high pressure fluid is applied.

Valve body 202 (Fig. 12) has an operating cylinder 203 with a movable valve 204 having four spaced collars 205, 206, 207 and 208.

A by-pass 209 leads from the high pressure supply pipe 103, branch 106 to the actuating cylinder 210 of the valve 202.

The actuating cylinder has a valve proper 211 with collars 212 and 213. The right-hand end of the valve 211 forms an armature 214 within a solenoid 215. The opposite end of the valve 211 is cushioned by a coil spring 216.

Pressure fluid from by-pass 209 is applied between collars 212 and 213. It is then diverted either to the right of the operating cylinder 203 by means of pipe 217, or to the left of the cylinder by pipe 218.

Suitable discharge from the operating cylinder 203 occurs through pipe 219 connected with the low pressure line 102.

When solenoid 215 is energized, the armature 214 is repelled so that pressure fluid is delivered to the left end of cylinder 203. This shifts the valve 204 to the right and permits discharge from pipe 199. This serves to reduce the pressure in the traversing valve and consequently to decelerate the traversing of the carriage at the end of each movement.

The following electric circuits are involved in the operation of this transfer mechanism.

A supply of electric current is received over lines 248, 249. This supply is assumed to be continuous in operation. When the crank grinding machine has completed its operation and stops, its clamps around the work are opened. The opposite ends of the clamps simultaneously close normally open limit switches 220 and 221, thus completing a circuit from line 248 through the normally closed control relay 222. This energizes the control relay 223.

A contact on relay 223 completes a circuit from 248 to energize the relay 224.

A second contact on relay 224 provides a holding circuit from limit switch 225 which is normally closed in either end of the position of the carrier and which opens momentarily during traverse movement to the left.

A contact on relay 224 completes a circuit from normally open limit switch 226 which is closed in the left traverse position to energize relay 227.

In the left hand position of the carrier, vertically moving heads are in the lowered position in which they actuate limit switches 228 and 229 to complete a circuit from 248 and energize relay 230.

A contact on relay 230 completes a circuit from a contact on relay 250 through relays 227 and 230 to energize relay 231.

Contacts on relay 231 energize valve solenoid 159 which directs fluid under pressure to the upper end of the two swinging cylinders 76 to swing the hooks 89 into pick-up position.

In the down-swung position of the hooks 89, limit switches 232 and 233 in the path of the hooks close to complete a circuit to energize relay 234.

A contact on relay 234 completes a circuit from relay 250 through relay 227 to energize relay 235. Relay 235 energizes valve solenoid 196 to direct fluid under pressure to the underside of the lift cylinders 65 to move the hooks 89 vertically.

At the end of the vertical movement, limit switches 228 and 229 are actuated to open the circuit from line 248 to relay 230 and closed to complete a circuit from line 248 to release contact on relay 236, thus releasing de-energized release 230.

A normally closed contact on relay 230 completes a circuit from 250 through 227 to energize relay 236. Relay 236 energizes the swinging valve solenoid 158 to direct fluid under pressure to the underside of the swing cylinders 76 to swing the work pieces out of the conveyor 95 and chuck, respectively.

The upwardly swinging movement actuates limit switches 232 and 233 to open the circuit of relay 234 and close a circuit from 248 to energize relay 237. Relay 237 energizes a release relay 238 to release de-energized relay 234. A normally closed contact or relay 234 completes a circuit from relay 250 through normally closed relay 230 to hold relay 235 energized.

Normally closed relay 230 also completes a circuit from relay 250 through normally closed relay 234 to energize a relay 239. Contacts on relay 239 energize traverse right valve solenoid 132.

Energized valve solenoid 132 directs fluid under pressure to the right end of the traverse cylinder 58 shifting the piston to the left. However, the movement of the piston is transmitted through a speed change actuated by a rack 51 attached to the traverse piston rod 60 to a stationary rack 50 so that movement of the carriage 25 and the traverse cylinder 58 is to the right.

As the carrier nears the end of its movement to the right, it actuates limit switch 240. This completes a circuit through relay 239 to energize relay 241. Contacts on relay 241 energize traverse cushion valve solenoid 215.

Valve solenoid 215 shifts the pilot valve 211 to the left and directs fluid under pressure to shift the cushion valve 204 to the right to direct exhaust fluid from the traverse valve 105 and the left end of the traverse cylinder to a blocked port. The only other outlet is through a throttle valve, not shown, on the exhaust lines.

At the end of the traverse movement to the right traverse limit switch 226 is actuated. In this position of the carrier, 226 completes a circuit to energize the release contact 242 and relay 243 and to de-energize relay 227.

Relay 243 completes a circuit from 249 through limit switches 220 and 221 to energize relay 222. Relay 222 opens de-energizing relay 223. A contact on relay 222 also closes to provide a holding circuit during the traverse movement when relay 243 is de-energized.

Relay 224 is held energized through limit switch 225 after relay 223 opens for the return to the left hand position.

De-energized relay 227 through normally closed contact completes a circuit from 250 through normally closed relay 230 to energize relay 231. Relay 231 energizes the swing-down valve solenoid 159 to swing the hooks down to position in which they may be moved vertically to deposit workpieces in the machine and in the take-away conveyor. At the end of the swing-down movement, limit switches 232 and 233 complete a circuit thus energizing relay 234. Relay 250 and 234 through normally closed relay 227 complete a circuit to energize relay 244.

Relay 244 closes to energize drop-down valve solenoid 195 directing fluid under pressure to the top side of the cylinders to move the heads down vertically.

Limit switches 228 and 229 in the down position complete a circuit to energize relay 230. Relay 230 completes a circuit from relay 250 through normally closed contact on relay 227 to energize relay 245. Relay 245 energizes swing-up valve solenoid 158.

Valve solenoid 158 directs fluid under pressure to the lower end of the swing cylinder to return the hooks to swing-up position. In the swing-up position limit switches 232 and 233 open the circuit to relay 234 and close the circuit to relay 237.

Relay 237 completes a circuit from 248 to relay 238 releasing de-energized relay 234.

Normally closed contact on relay 237 opens a de-energizing clamp valve solenoid 247 directing fluid to close the work clamps and also to start work rotation and a grinding cycle as described in copending application filed November 25, 1955, Serial No. 548,962 which has issued as Patent No. 2,809,472, October 15, 1957.

In the right hand position of the carrier, limit switch 226 de-energizes relay 227 and energizes release relay 242 to release relay 227. This opens one circuit to lift-up valve solenoid 196. The other circuit is open at normally closed relay 230. Thus the hooks stop at the end of the swing-up position. At this part of the cycle, the lift piston remains in the down position.

In this position, as described above, relay 234 is de-energized and released so that a circuit is completed from relay 250 through normally closed contact or relay 234 and normally closed contact or relay 230 to energize relay 246 and traverse left valve solenoid 133 to direct fluid under pressure to the left end of the traverse cylinder 58. The traverse piston moves to the right, shifting gears along the rack which is attached to the traverse cylinder. The gears rotate in a counterclockwise direction.

The carrier moving to the left position opens limit switch 225 which held relay 224 de-energizing it until after the clamps have closed and opened limit switches 220 and 221 so that relay 227 will not be energized by limit switch 226 in the traverse left position and the hooks remain in swing-up position until the next traverse cycle is signalled for.

The carrier nearing the left traverse station, closes the left cushion limit switch 225, completing the circuit through relay 246 to relay 241. Contacts on relay 241 closes energizing cushion valve solenoid 215.

Valve solenoid 215 shifts the pilot valve 211 to the left to direct exhaust fluid from the traverse valve and the right end of the traverse cylinder to a block part. The only outlet is through a throttle valve 258 to the exhaust lines.

While the invention has been described for purposes of example with reference to its utility in grinding the bearings of crankshafts, the mechanism is well adapted for other purposes and the production of other articles. Also, it is not to be considered as limited solely to a grinding operation. In view of this, the scope of the invention is to be considered as limited only by the following claims.

What is claimed is:

1. A work transfer apparatus comprising a support, a horizontal track thereon, a traversing carriage on the track, spaced trucks forming part of said carriage, power means for reciprocating the carriage on the track, a vertical slide on each truck, two pairs of links of unequal length pivoted to each slide, depending arms pivoted to the links, hooks attached to said arms, power means for reciprocating each slide and independent power means for oscillating the links.

2. Work transfer apparatus comprising a support, a horizontal track thereon, a longitudinal rack on the track, a traversing carriage on the track, a rack on the carriage, parallel track means on the carriage, a traveller on said track means, gears journalled on the traveller and engaging each rack, power means on the carriage for reciprocating the traveller, spaced trucks forming part of said carriage, a vertical slide on each truck, two pairs of links of unequal length pivoted to each slide, depending arms pivoted to the links, hooks attached to said arms, power means for reciprocating each slide and independent power means for oscillating the links.

3. Work transfer apparatus comprising a support, a horizontal track thereon, a traversing carriage on the track, spaced trucks forming part of said carriage, power means for reciprocating the carriage on the track, a vertical slide on each truck, a fluid motor mounted on each truck and attached to each slide, two pairs of links of unequal length pivoted on each slide, depending arms pivoted to the links, work-engaging hooks attached to said arms, a cross-bar connecting the upper links of each pair, and a fluid motor mounted on each slide and attached to the cross-bar of said slide.

4. Work transfer apparatus comprising a support, a horizontal track thereon, a traversing carriage on the track, spaced trucks forming part of said carriage, power means for reciprocating the carriage on the track, a vertical slide on each truck, a fluid motor mounted on each truck and attached to each slide, two pairs of links pivoted on each slide, the upper link of each pair being longer than the lower link, depending arms pivoted to the links, work-engaging hooks attached to said arms, a cross-bar connecting the upper links of each pair, and a fluid motor mounted on each slide and attached to the cross-bar of said slide.

5. Work transfer apparatus comprising a support, a horizontal track thereon, a traversing carriage on the track, spaced trucks forming part of said carriage, power means for reciprocating the carriage on the track, a vertical slide on each truck, two pairs of links of unequal length pivoted to each slide, depending arms pivoted to the links, hooks attached to said arms, power means for reciprocating each slide and independent power means for oscillating the links and operating means for operating said several power means in timed sequence.

6. Work transfer apparatus comprising a support, a horizontal track thereon, a traversing carriage on the track, spaced trucks forming part of said carriage, power means for reciprocating the carriage on the track between fixed spaced work stations, a vertical slide on each truck, two pairs of links of unequal length pivoted to each slide, depending arms pivoted to the links, hooks attached to said arms, power means for reciprocating each slide simultaneously at each work station and independent power means for oscillating the links when the slides are opposite the work stations.

7. Work transfer apparatus comprising a support, a horizontal track thereon, a traversing carriage on the track, spaced trucks forming part of said carriage, power means for reciprocating the carriage on the track between fixed spaced work stations, a vertical slide on each truck, two pairs of links of unequal length pivoted to each slide, depending arms pivoted to the links, hooks attached to said arms, operating means for the several power means to traverse the carriage from one work station to the adjacent work station, to sequentially lower the arms into work-engaging position, lift the work-piece at the corresponding work station, traverse the carriage to the next work station, lower the work-piece thereinto, disengage the work piece, lift the arms and return the carriage to the first work station.

8. In combination with a work transfer apparatus, including a vertical slide, two pairs of links of unequal length pivoted to each slide with the longer link above the shorter link of the same pair, a depending arm pivoted to the outer ends of each pair, work-engaging hooks attached to the arms, a cross-bar connecting the upper links of each pair and a fluid motor on the slide and attached to the cross-bar.

9. In combination with a work transfer apparatus, including a vertical slide, two pairs of links of unequal length pivoted to each slide with the longer link above the shorter link of the same pair, a depending arm pivoted to the outer ends of each pair, a work-engaging hook attached to each arm and a second shorter work-engaging hook attached to one arm.

10. In combination with work transfer apparatus having a horizontally traversing carriage, a pair of vertically reciprocable slides on said carriage and work-engaging arms pivoted on said slides, of power operating means for traversing the carriage, power operating means for reciprocating each slide, and separate power operating means for oscillating the arms at a right angle to the direction of traverse, and means actuated by the traverse of the carriage for actuating the slide reciprocating means and the arms oscillating means in sequence.

11. A transfer apparatus for a machine tool comprising spaced supporting members mounted independently of said machine tool but in predetermined relation thereto, a horizontal track mounted on said supporting members, a carriage slidably mounted on said track, a slide mounted for vertical movement on said carriage, a work lifting device comprising a pair of spaced hooks, a pair of vertically spaced links connecting each of said hooks to said slide, a hydraulic motor on said carriage and connected to said slide for effecting said vertical movement and a hydraulic motor on said slide, and connecting means between said second hydraulic motor and said hook supporting means.

12. A transfer apparatus for a machine tool comprising spaced supporting members, a horizontal track mounted on said supporting members, a carriage slidably mounted on said track, a slide mounted for vertical movement on said carriage, a work lifting device comprising a pair of spaced hooks, a pair of vertically spaced links connecting each of said hooks to said slide, a hydraulic motor on said carriage and connected to said slide for effecting said vertical movement and a hydraulic motor on said slide, and connecting means between said second hydraulic motor and said hook supporting means, said supporting members being mounted independently of and in predetermined adjustable relation to said machine tool.

13. A transfer apparatus for a machine tool comprising supporting means, a horizontal track mounted on said supporting means, a carriage slidably mounted on said track, a slide mounted for vertical movement on said carriage, a work lifting device comprising a pair of spaced hooks, a pair of vertically spaced links connecting each of said hooks to said slide, a hydraulic motor on said carriage and connected to said slide for effecting said vertical movement and a hydraulic motor on said slide, and connecting means between said second hydraulic motor and said hook supporting means, and means for adjusting the spacing between said hooks whereby to accommodate work-pieces of different dimensions.

14. In a machine tool for performing a machining operation on a workpiece, a transfer apparatus comprising supporting means, a horizontal track mounted on said supporting means, a carriage slidably mounted on said track, a slide mounted for vertical movement on said carriage, a work lifting device comprising a pair of spaced hooks, a pair of vertically spaced links connecting each of said hooks to said slide, a hydraulic motor on said carriage and connected to said slide for effecting said vertical movement and a hydraulic motor on said slide, and connecting means between said second hydraulic motor and said hook supporting means, and means for adjusting the spacing between the hooks whereby to accommodate workpieces of different dimensions, control means for effecting a predetermined sequence of operation of said hydraulic motor, said control means being actuated by said machine tool at the end of a machining operation.

15. In a machine tool for performing a machining operation on a workpiece, a transfer apparatus comprising supporting means, a horizontal track mounted on said supporting means, a carriage slidably mounted on said track, a slide mounted for vertical movement on said carriage, a work lifting device comprising a pair of spaced hooks, a pair of vertically spaced links connecting each of said hooks to said slide, a hydraulic motor on said carriage connected to said slide for effecting said vertical movement, a hydraulic motor on said slide, and connecting means between said second hydraulic motor and said hook supporting means, and means for adjusting the spacing between the hooks whereby to accommodate workpieces of different dimensions, control means for effecting a predetermined sequence of operation of said hydraulic motor, said control means being actuated by said machine tool at the end of a machining operation, control means actuated by said transfer apparatus at the end of a transfer cycle for starting said machine tool.

16. Apparatus for placing a workpiece in or removing it from a machine comprising a supporting frame, a carriage mounted for vertical movement on said frame, a hydraulic motor for effecting said vertical movement, spaced hooks attached to said carriage by vertically spaced links, a hydraulic motor mounted on said carriage and attached to said hooks, supporting means for effecting movement of said hooks in a path determined by said links and means responsive to the movement of said hooks for controlling said first mentioned hydraulic motor.

17. Apparatus for placing a workpiece having supporting portions at different elevations, in or removing it from a machine comprising a supporting frame, a carriage mounted for vertical movement on said frame, spaced hooks movably mounted on said carriage at different elevations, and means for interchanging the hooks horizontally relative to one another.

18. Apparatus for placing a crankshaft in or removing it from a machine comprising a supporting frame, a carriage mounted for vertical movement on said frame, spaced hook supporting members movably mounted on said carriage, hooks removably mounted on said supporting members, a crank-pin engaging hook and means on said supporting members for selectively mounting said hook in desired spaced relation on either side of each first-named hook.

19. A transfer apparatus for a machine tool comprising a track member suitably supported in relation to said machine tool, a carriage movably mounted on said track member, means for effecting the movement of said carriage comprising a piston and cylinder movable with said carriage, a piston rod on said piston, a rack on said carriage, a traveler on and movable with said carriage, a speed reducing means on said traveler including a small gear in engagement with the teeth of said rack, a larger gear operatively connected with said small gear, and a stationary rack on said track member, said larger gear being in mesh with said stationary rack.

20. A transfer apparatus for a machine tool comprising spaced supporting members, a horizontal track mounted on said supporting members, a carriage slidably mounted on said track, a slide mounted for vertical movement on said carriage, a work lifting device comprising a pair of spaced hooks, a pair of vertically spaced links connecting each of said hooks to said slide, a hydraulic motor on said carriage and connected to said slide for effecting said vertical movement and a hydraulic motor on said slide, and connecting means between said second hydraulic motor and said hook supporting means, said supporting members being mounted independently of and in predetermined adjustable relation to said machine tool, a base member for said supporting members, and means for adjusting said supporting members on said base member.

References Cited in the file of this patent

UNITED STATES PATENTS

| | | |
|---|---|---|
| 710,920 | Morgan | Oct. 7, 1902 |
| 891,863 | Ruckels | June 30, 1908 |
| 1,950,040 | Smith | Mar. 6, 1934 |
| 2,749,674 | Narel | June 12, 1956 |